T. R. BEGGS.
VALVE OR FAUCET.
APPLICATION FILED MAY 6, 1908. RENEWED MAR. 9, 1910.

972,431.

Patented Oct. 11, 1910.

UNITED STATES PATENT OFFICE.

THOMAS R. BEGGS, OF ENGLEWOOD, NEW JERSEY, ASSIGNOR TO THE THOMAS . BEGGS FAUCET AND VALVE COMPANY, OF ENGLEWOOD, NEW JERSEY, A CORPORA TION OF NEW JERSEY.

VALVE OR FAUCET.

972,431.  Specification of Letters Patent.  Patented Oct. 11, 1910

Application filed May 6, 1908, Serial No. 431,094. Renewed March 9, 1910. Serial No. 548,368.

*To all whom it may concern:*

Be it known that I, THOMAS R. BEGGS, a citizen of the United States, and resident of Englewood, in the county of Bergen and State of New Jersey, have made a certain new and useful Invention Relating to Valves or Faucets, of which the following is a speci-. fication, taken in connection with the accompanying drawings, which form a part of the same.

This invention relates to valves or faucets and relates more particularly to faucets employed for drawing liquids under pressure.

In the accompanying drawings, showing an illustrative embodiment of this invention, and in which the same reference numerals refer to similar parts in the several figures, Figure 1 is a longitudinal sectional view of the faucet. Fig. 2 is a transverse view, taken on the line 2—2 of Fig. 1, and Fig. 3 is an enlarged detail sectional view.

In the illustrative embodiments of this invention, shown in the drawings, the casing of the faucet comprises, a central section which may consist of threaded collars 11 and 12, united by a plurality of bars 9 and 10, and inner and outer end sections 1 and 13 which are provided with threaded portions to engage the threaded collars when the parts are in their assembled positions. The inner section 1, may be provided with a threaded portion 28 by means of which the faucet may be attached to any suitable support and the outer portion 13 may be provided with a suitable spout 17. Each of said end sections may be provided with a seat 29 against which the packing 19, of cork, leather, rubber and so forth, is adapted to rest and said packing may be retained in its position by means of a bushing 24, which may be provided with an interior thread and may have lugs 22 engaging recesses 23 formed in the casing, to permit longitudinal movement of said bushing, but to prevent it from rotating, in order that as the bushing is moved to exert greater or less pressure upon the packing, the direction of the pressure will always be normal to the packing and there will be no surface slip and no tendency to tear or mutilate the packing.

Motion may be imparted to the inner bushing by means of a sleeve 25 which may be provided with a threaded portion engaging the threaded portion of bushing and which may be provided with a flange 26 seated i the recess 27 formed in the casing to perm the sleeve to rotate freely but to prevel any longitudinal movement of the sam Suitable recesses 21 may be formed in th exposed surface of the sleeve 25, adapted t be engaged by a spanner wrench or an other suitable tool by means of which th sleeve may be rotated, without having t take the casing apart. As the sleeve 25 rotated, the bushing 24 will be advanced c retracted to exert a greater or less pressu upon the packing 19, its direction of move ment depending, of course, upon the dire tion of rotation of the sleeve 25.

Movably mounted within the casing an supported within the sleeves 25 is a tubula valve 3, to the movement of which the liqui whether under high or low pressure, offel practically no resistance, and the outer en 16, of which when the valve is in its norm or closed position will engage a replaceabl packing 14 which may be retained in posi tion by a nut 15, thus preventing flow o liquid through the faucet. When the tu bular valve is moved into its discharge o open position as shown in Fig. 1, liquid i permitted to flow through said tubular valv and out through the spout 17.

Movement may be imparted to the tubula valve 3 by means of a handle 8 which ma be supported up on the bar 9 in any suit able manner as by a pivot 6 and said handl may be provided with arms 30 which ma have slots 7 formed therein with which roll ers 34 engage which may be mounted upo the tubular valve 3, in any suitable manne as by being loosely mounted on the lugs on the valve.

Having thus described this invention i connection with the illustrative embodiment thereof, to the details of which disclosur the invention is not, of course, to be limited what is claimed as new and what is desire to be secured by Letters Patent is set / :tl in the appended claims.

1. In a faucet, a casing comprising a cen tral section consisting of threaded collar united by a plurality of bars, end section provided with threaded portions engagin the threaded collars, a tubular valve mov ably mounted within said casing, each o said end sections being provided with a seat packing supported in said seats co-acting with said valve, interiorly threaded bushings co-acting with said packings and provided with lugs engaging slots in said casing, sleeves having threaded portions engaging the threads of the bushings and provided with flanges engaging in recesses formed in said casing, operating recesses formed in the exposed surface of said sleeves, a handle to operate said valve mounted upon said casing and provided with arms, having slots formed therein, lugs on said valve, rollers carried by said lugs and engaging said slots and a replaceable packing with which the outer end of said tubular valve engages when in its closed position.

2. In a faucet, a casing comprising a central section comprising connected threaded collars, end sections provided with threaded portions engaging the threaded collars, a tubular valve movably mounted within said casing, each of said end sections being provided with a seat, packing supported in said seats and coacting with said valve, interiorly threaded bushing co-acting with said packings and provided with lugs engaging slots in said casings, sleeves having threaded portions engaging the threads of the bushings and provided with flanges engaging in recesses formed in said casings, operating recesses formed in the exposed surface of said sleeves, a handle to operate said tubular valve and a replaceable packing with which the outer end of said tubular valve engages when in its closed position.

3. In valves, a casing comprising a central section having connected collars, end sections provided with portions connected to said collars, a tubular valve movably mounted within said casing, packing supported in each of said end sections and co-acting with said valve, longitudinally movable bushings co-acting with said packings, rotary sleeves cooperating with said bushings to move the same, and provided with a normally exposed surface, means to move said tubular valve and a packing with which the outer end of said valve engages when in its closed position.

4. In valves, a casing, a tubular valve movably mounted within said casing, a plurality of packings supported within said casing and co-acting with said valve, longitudinally movable bushings co-acting with said packings, rotary sleeves held against substantial longitudinal movement, coöperating with said bushings to move the same, and provided with normally exposed, substantially radial, operating surfaces, means to move said tubular valve and means for closing the outer end of said valve when in its normal position.

5. In valves, a casing, a tubular valve movably mounted in said casing, a handle projecting from said casing to longitudinally operate said valve, a discharge spout formed on said casing, and a packing within said casing beyond the connecting portion of said discharge spout and against which the end of said valve engages when in closed position.

6. In valves, a casing, a movable member mounted in said casing, packing within said casing and co-acting with said member, non-rotary means for exerting pressure upon said packing and an operating sleeve having threaded engagement with said means for operating the same and having a flange held in a recess to prevent substantial longitudinal movement of said sleeve.

7. In valves, a casing, a tubular valve movably mounted in said casing, packing within said casing and co-acting with said valve, non-rotary means for exerting pressure on said packing, an operating sleeve having threaded engagement with said means to operate the same and having a flange and a collar forming a recess in which said flange is held to prevent substantial longitudinal movement of said sleeve while leaving an exposed surface for engagement with an operating tool.

8. In valves, a casing, a tubular valve movably mounted in said casing, packing in said casing coöperating with said valve, means to longitudinally operate said valve, a discharge spout formed on said casing, and a closure packing mounted in said casing beyond the connecting portion of said discharge spout and against which the end of said tubular valve engages when in closed position.

THOMAS R. BEGGS.

Witnesses:
WILLIAM P. JONES,
FLORENCE E. WOLFE.